US006978198B2

(12) United States Patent
Shi

(10) Patent No.: US 6,978,198 B2
(45) Date of Patent: Dec. 20, 2005

(54) SYSTEM AND METHOD TO LOAD VEHICLE OPERATION SOFTWARE AND CALIBRATION DATA IN GENERAL ASSEMBLY AND SERVICE ENVIRONMENT

(75) Inventor: Jianying Shi, Rochester Hills, MI (US)

(73) Assignee: General Motors Corporation, Detroit, MI (US)

( * ) Notice: Subject to any disclaimer, the term of this patent is extended or adjusted under 35 U.S.C. 154(b) by 69 days.

(21) Appl. No.: 10/692,332

(22) Filed: Oct. 23, 2003

(65) Prior Publication Data

US 2005/0090942 A1 Apr. 28, 2005

(51) Int. Cl.[7] .............................................. G06F 19/00
(52) U.S. Cl. ......................................... 701/33; 701/35
(58) Field of Search .............................. 701/29, 31, 33, 701/35; 709/213, 217, 218, 219

(56) References Cited

U.S. PATENT DOCUMENTS

| | | | | |
|---|---|---|---|---|
| 5,442,553 A | * | 8/1995 | Parrillo ........................ 455/420 |
| 5,781,125 A | * | 7/1998 | Godau et al. ............ 340/870.01 |
| 6,370,449 B1 | * | 4/2002 | Razavi et al. ..................... 701/1 |
| 6,411,880 B1 | * | 6/2002 | McKee et al. .................. 701/55 |
| 6,430,164 B1 | * | 8/2002 | Jones et al. ................... 370/313 |
| 6,434,455 B1 | * | 8/2002 | Snow et al. .................... 701/33 |
| 6,483,906 B1 | * | 11/2002 | Iggulden et al. ......... 379/102.03 |
| 6,629,029 B1 | * | 9/2003 | Giles .............................. 701/35 |
| 6,687,587 B2 | * | 2/2004 | Kacel ............................. 701/33 |
| 6,823,247 B1 | * | 11/2004 | Issa et al. ....................... 701/36 |
| 6,832,141 B2 | * | 12/2004 | Skeen et al. ................... 701/35 |
| 6,847,872 B2 | * | 1/2005 | Bodin et al. ................... 701/33 |
| 6,882,712 B1 | * | 4/2005 | Iggulden et al. ......... 379/102.03 |
| 2002/0035429 A1 | * | 3/2002 | Banas ........................... 701/115 |
| 2003/0163587 A1 | * | 8/2003 | Knight et al. ................ 709/249 |

FOREIGN PATENT DOCUMENTS

WO   WO 2004/079565   * 9/2004

* cited by examiner

Primary Examiner—Michael J. Zanelli
(74) Attorney, Agent, or Firm—Kathryn A. Marra

(57) ABSTRACT

A data exchange system for use in vehicle assembly includes a data exchange mechanism exchanging vehicle software and/or diagnostic information between vehicle processors and an external processor. In one aspect, the data exchange mechanism is a portable memory device, such as a USB flash disk, alternately connecting to USB ports of the external processor and the vehicle. Vehicle software is automatically loaded onto vehicle processors by an interface processor connected to a CAN controller, and the processors similarly write back diagnostic information. In another aspect, the data exchange mechanism is a wireless mechanism, such as an iCHIP, connecting the external processor and vehicle processors through a communications network and a CAN controller. Vehicle processors individually wirelessly request appropriate vehicle software and/or provide diagnostic information. The data exchange mechanism may be permanently integrated into the vehicle, or temporarily connected to the vehicle by an alternative connection mechanism, such as the ALDL.

18 Claims, 5 Drawing Sheets

SYSTEM AND METHOD TO LOAD VEHICLE OPERATION SOFTWARE AND CALIBRATION DATA IN GENERAL ASSEMBLY AND SERVICE ENVIRONMENT

FIELD OF THE INVENTION

The present invention relates to systems and methods of data exchange between vehicle processors and external processors for use in vehicle assembly.

BACKGROUND OF THE INVENTION

Today's vehicles typically come equipped with an assembly line diagnostic link (ALDL) mounted, for example, on the driver's side underneath the dash. This link provides external line access to a vehicle system bus connecting multiple vehicle processors. Ideally, these vehicle processors come preloaded with all of the software needed to operate their respective vehicle component systems. As a result, calibration data alone may be added through the ALDL once the vehicle is assembled and started so that the calibration data can be generated.

Sometimes, however, it is necessary to upgrade, replace, or otherwise supplement the software in a processor based on slight variations and/or progressive changes in vehicle component systems. It may similarly be necessary to supplement the software based on different, possible combinations of component systems and related processors. In such cases, it is inconvenient to reprogram the processors prior to assembly, and assembly lines may therefore incorporate a supplemental software loading stage after assembly and before first starting of the vehicle. During this stage, a two-way link is typically formed by wire between a stationary external processor and the vehicle processors via the ALDL connection. Unfortunately, the ALDL connection is typically slow, and a bottleneck in production may therefore be created at the end of the assembly line.

There have been some attempts to ease the bottleneck in production caused by the slow ALDL link. Such solutions include, for example, a faster bus, such as an improved controller area network (CAN) system bus that allows parallel flash programming of the multiple processors. This solution allows faster overall programming of multiple vehicle processors. Also, external processors have been made portable and mountable to the vehicle steering wheel. This solution allows the supplemental programming process to begin before the end of the assembly line. However, the portable, external processors cannot be introduced to the vehicles until the ALDLs and the steering wheels have been added to the vehicles. Also, these processors are expensive due to specialized form and function, and multiple external processors are further required to allow mounting in the vehicles as they move down the assembly line. Therefore, the need remains for a solution to the aforementioned problems that reduces expense and saves time in the assembly process. The present invention fulfills this need.

SUMMARY OF THE INVENTION

A data exchange system for use in vehicle assembly includes a data exchange mechanism exchanging vehicle software and/or diagnostic information between vehicle processors and an external processor. In one aspect, the data exchange mechanism is a portable memory device, such as a USB flash disk, alternately connecting to USB ports of the external processor and the vehicle. Vehicle software is automatically loaded onto vehicle processors by an interface processor connected to a CAN controller, and the processors similarly write back diagnostic information. In another aspect, the data exchange mechanism is a wireless mechanism, such as an iCHIP, connecting the external processor and vehicle processors through a communications network and a CAN controller. Vehicle processors individually wirelessly request appropriate vehicle software and/or provide diagnostic information. The data exchange mechanism may be permanently integrated into the vehicle. Alternatively, it may be temporarily connected to the vehicle by an alternative connection mechanism, such as the ALDL.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 1:
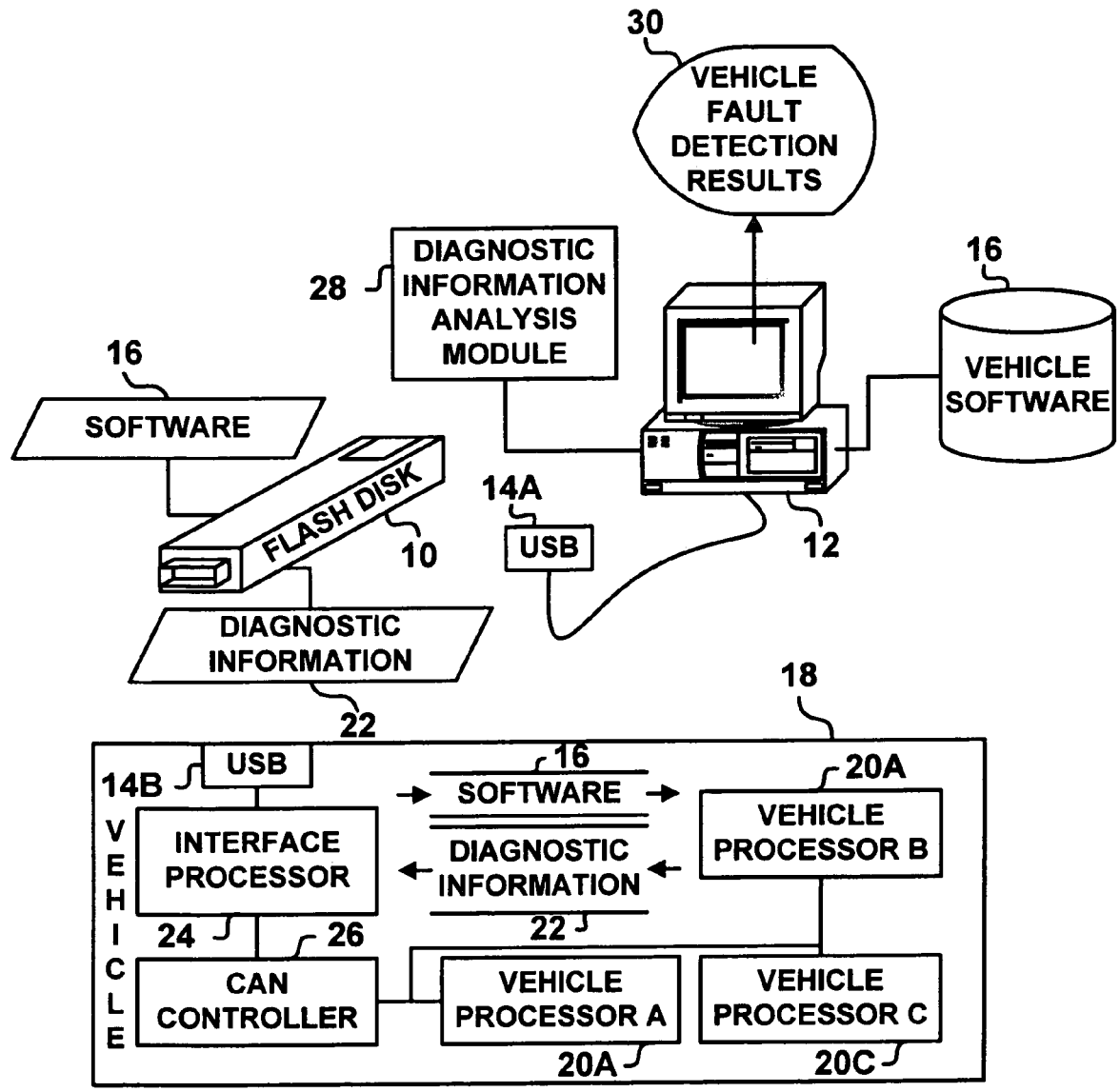
FIG. 1 is a partial-perspective, functional block, and entity relationship diagram depicting a first embodiment of the data exchange system according to the present invention.

Referring to FIG. 1, a first embodiment of the data exchange system according to the present invention includes a data exchange mechanism 10 that is a portable memory device, such as a flash disk, in a vehicle assembly, upgrade, or repair process. Accordingly, external processor 12 is initially connected to mechanism 10 via a first open architecture communications port 14A, such as a universal serial bus (USB) port, and stores vehicle software 16 in mechanism 10 for transfer to vehicle 18. It is envisioned that the type of vehicle software 16 initially stored in mechanism 10 may vary according to the type of process being performed. In an assembly or upgrade process, for example, the vehicle software 16 may correspond to supplemental software adapting vehicle processors 20A–20C to operate their respective vehicle component systems. Alternatively or additionally, the vehicle software 16 may correspond to calibration data improving operation of vehicle component systems by vehicle processors 20A–20C. Also, the vehicle software 16 may correspond to a query or other trigger data for prompting write out of diagnostic information 22 from vehicle processors 20A–20C during a repair process.

Communication of software 16 from mechanism 10 to processors 20A–20C occurs via open architecture communications port 14B, such as a USB port, provided to vehicle 18. The port 14B is provided to vehicle 18 by connection of port 14B to interface processor 24 having a driver operable to automatically recognize and access mechanism 10. Interface processor 24 connects in turn to controller area network (CAN) controller 26. It is envisioned that other types of bus controllers 28 may be employed with other types of bus networks. Preferably, however, a CAN-based system bus is employed and interface processor 24 is adapted to parallel flash program vehicle processors 20A–20C with files received over port 14B from mechanism 10. In an assembly or upgrade process, it is envisioned that vehicle processors 20A–20C will automatically test the newly installed/upgraded software 16 and write back results as diagnostic information 22 to mechanism 10 via interface processor 24 and port 14B. During a repair process, it is envisioned that vehicle processors will write out fault detection results as diagnostic information 22 to mechanism 10 via interface processor 24 and port 14B.

Diagnostic information 22 is subsequently transferred from mechanism 10 to external processor 12 via port 14A. Diagnostic information analysis module 28 then analyzes the received data. In an assembly or upgrade process, for example, module 28 verifies that the installation or upgrade was successful and feeds this information back into an assembly or upgrade process. In a repair process, module 28 decrypts the diagnostic information 22 and renders a visual display 30 of the fault detection results via an active display of external processor 12.

It is envisioned that various types of communications ports 14A and 14B, such as a flash card reader, fire wire, and others may be employed. It is also envisioned that various types of mechanisms 10, such as a flash card, zip drive, or others, may be employed. It is preferred, however, that port 14A and port 14B be identical in type so that mechanism 10 to facilitate alternating connection of mechanism to vehicle 18 and external processor 12. The relatively low cost, high speed, and high storage capacity of the USB flash disk make it a currently preferred choice for a type of mechanism 10, and the USB port is a currently preferred choice for ports 14A and 14B based on its compatibility with the USB flash disk.

Figure 2:
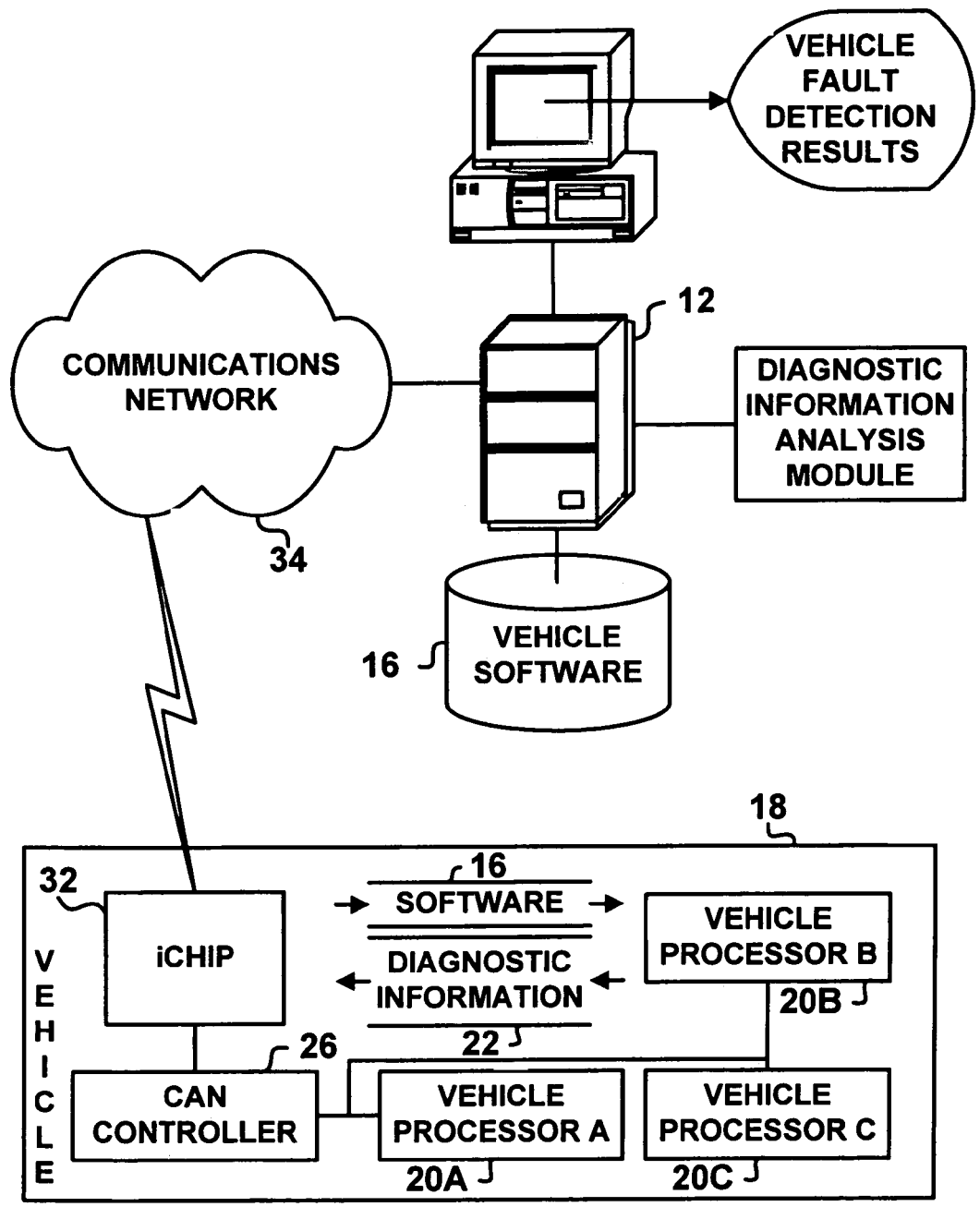
FIG. 2 is a partial-perspective, functional block, and entity relationship diagram depicting a second embodiment of the data exchange system according to the present invention.

Referring to FIG. 2, a second embodiment of the data exchange system according to the present invention includes a data exchange mechanism 10 that is wireless, such as an iCHIP controller, provided to vehicle 18. Mechanism 32 is connected to vehicle processors 20A–20C via bus controller 26. data transfer procedures vary according to a type of process relating to vehicle modification.

In an assembly or upgrade process, external processor 12 is connected to communications network 32, such as the Internet, and is adapted to wirelessly transmit vehicle software 16 via communications network 32 in response to a received file request. In turn, vehicle processors 20A–20C individually request their respective files of vehicle software 16 from external server 12 via mechanism 32 and communications network 34. Processors 20A–20C automatically test the newly installed or upgraded software and transmit results back to external processor 12 as diagnostic information 22. It is envisioned that external processor 12 may request information from processors 20A–20C relating to current versions of vehicle software and upgrade history. Analysis procedures are similar to those discussed with reference to the first embodiment.

In a repair process, external processor 12 is adapted to wirelessly transmit a request for diagnostic information to vehicle processors 20A–20C via communications network 34 and mechanism 32. Accordingly, vehicle processors 20A–20C are adapted to generate and/or retrieve fault detection results and wirelessly transmit them to external processor 12 via mechanism 32 and network 34. It is envisioned that the request from external processor 12 may include a command for processors 20A–20C to perform predefined diagnostic tests to generate diagnostic information 22. Analysis procedures are similar to those discussed with reference to the first embodiment.

Figure 3:
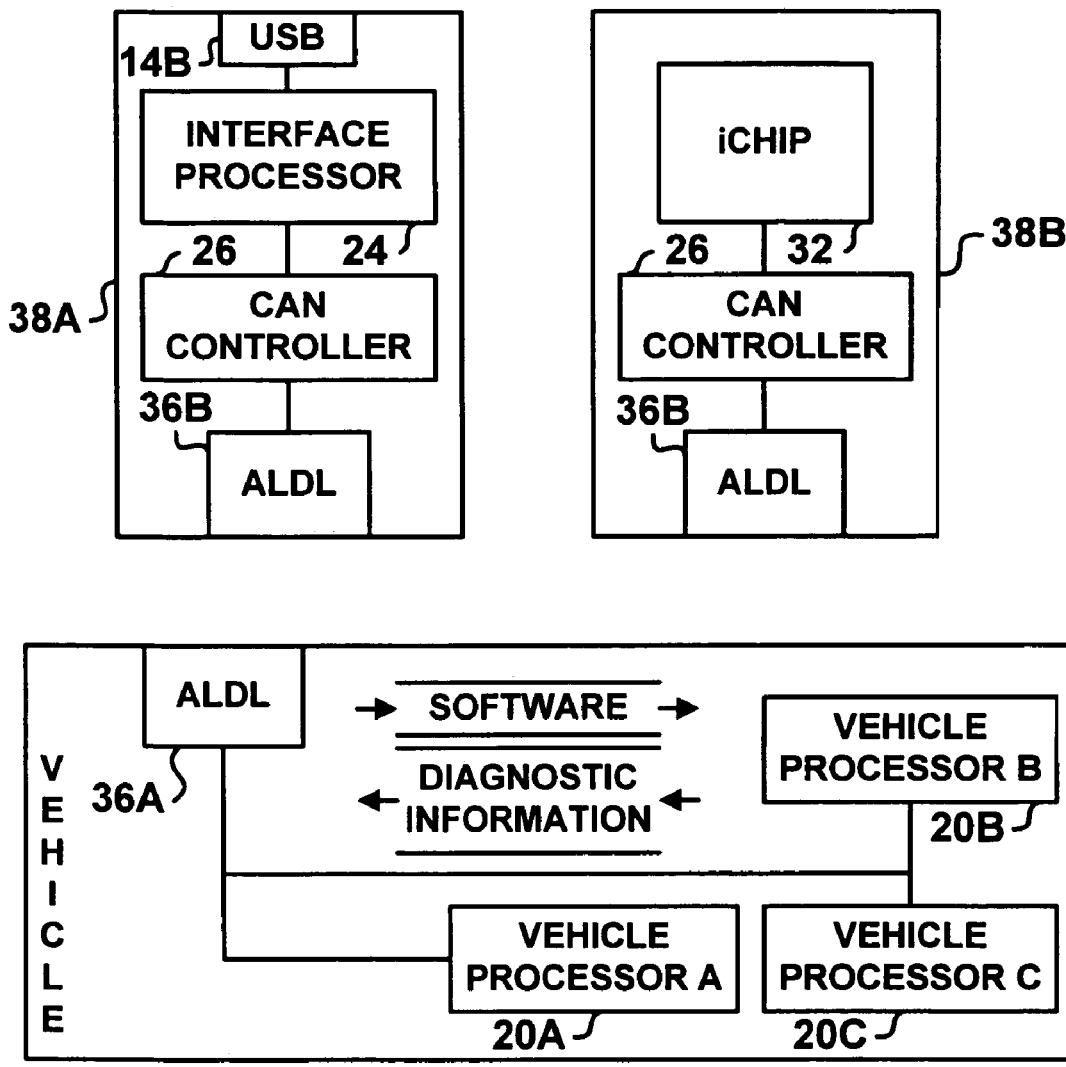
FIG. 3 is a block diagram depicting sub-embodiments of the data exchange system according to the present invention.

Referring to FIG. 3, it is envisioned that open architecture communications port 14B or wireless date exchange mechanism 32 need not be permanently incorporated into vehicle 18. Instead, port 14B may be provided temporarily during a vehicle assembly, upgrade, or repair process via an alternative connection mechanism 36A, such as the vehicle's standard ALDL connection. For example, temporary connection module 38A may be employed in the first embodiment described above with reference to FIG. 1. Accordingly, module 38A includes port 14B connected to alternative connection mechanism 36B via interface processor 24 and bus controller 26. Also, temporary connection module 38B may be employed in the second embodiment described above with reference to FIG. 2. Accordingly, module 38B includes mechanism 32 connected to alternative connection mechanism 36B via bus controller 26.

Alternative connection mechanisms 36A and 36B are designed to interface with one another and provide communication between port 14B or mechanism 32 and processors 20A–20C while the connection is maintained. In this way, expensive components like microcontrollers and iCHIPS may be reused during assembly, upgrade and repair procedures, thus reducing the number of such components that must be produced to accomplish the invention on a large scale, as with a fleet of vehicles. It is further envisioned that many different types of alternative connection mechanisms may be employed other than or in addition to ALDL. For example, the alternative connection mechanism 36A and 36B may include a direct connection of the controller 26 to the system bus of the vehicle 18 in place of a vehicle processor or ALDL port that is yet to be installed. This implementation allows the temporary connection to be initiated in an assembly process at a point before the ALDL connection or even all of the processors are installed. The alternative connection mechanism 36A and 36B may also be multi-faceted, such that the controller 26 is initially connected directly to the system bus of the vehicle 18, and later connected via the ADLD port following installation of the ALDL port. Other embodiments of the alternative connection mechanism will be readily apparent to those skilled in the art, especially as new types of communication ports are added to vehicles in addition to or in place of the ALDL port.

Figure 4:
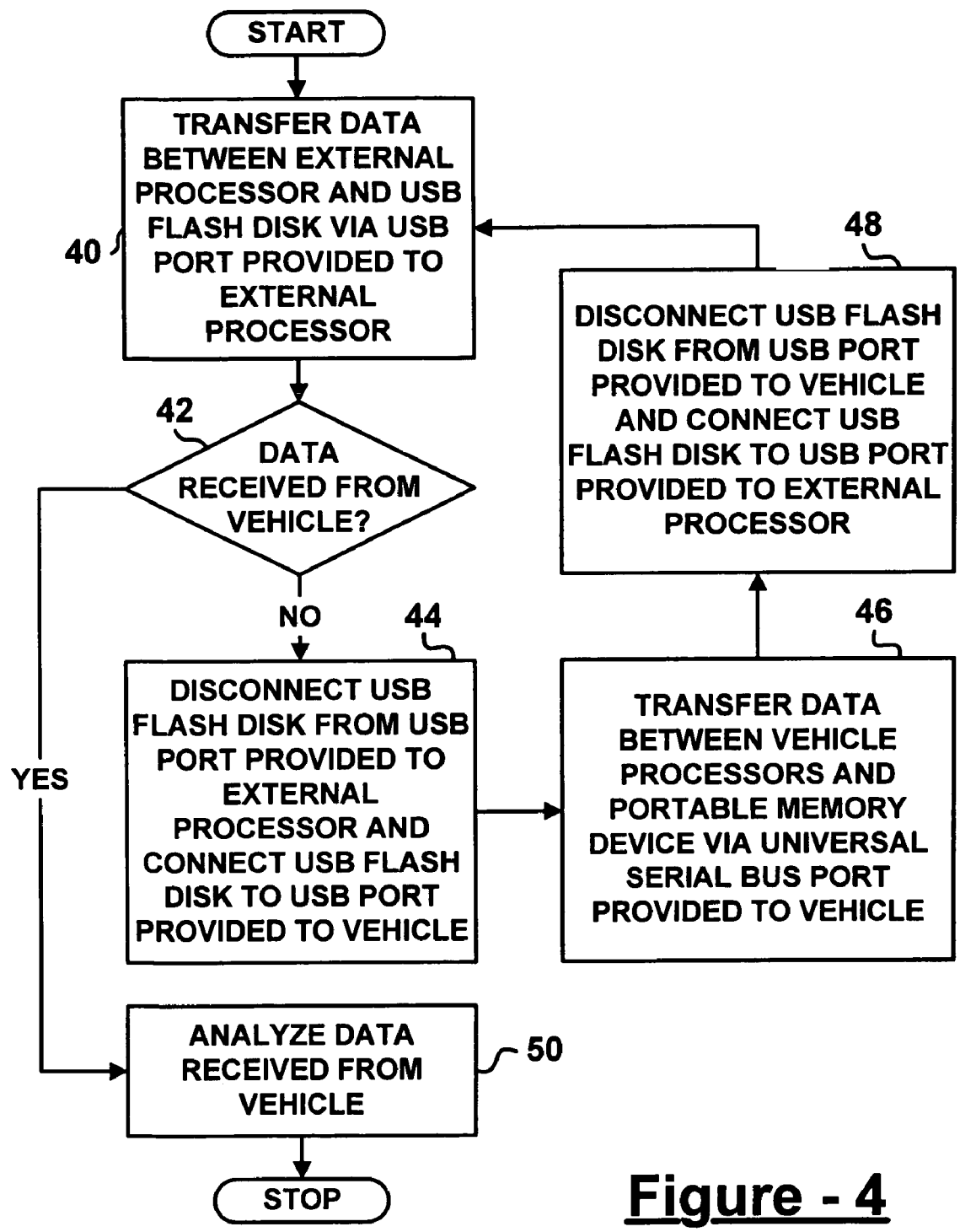
FIG. 4 is a flow diagram depicting a first embodiment of the data exchange method according to the present invention.

Referring to FIG. 4, a first embodiment of the data exchange method according to the present invention includes transferring data between an external processor and a portable memory device via an open architecture communications port provided to the external processor in step 40. In a presently preferred embodiment, step 40 includes employing a USB flash disk as the portable memory device, and a personal computer with a USB port as the external processor and the open architecture communications port as discussed above with reference to FIG. 1. At the start of the process, data is not being received from the vehicle as at 42

(FIG. 4), but rather stored in the portable memory device as described above. Thus, the device is disconnected from the port of the external processor and connected to a similar port of the vehicle at step 44.

Once connection is established between the portable memory device and the vehicle at step 44, data is transferred between vehicle processors and the portable memory device at step 46. Typically, step 46 includes automatic recognition of the device by the interface processor of the vehicle, transfer of appropriate vehicle software files from the portable memory device to respective vehicle processors, and write back of diagnostic information from the vehicle processors to the portable memory device. The nature of the vehicle software and diagnostic information may vary according to the type of process being performed as discussed above with reference to FIG. 1.

Following write back of diagnostic information data to the portable memory device at step 46 (FIG. 4), the portable device is disconnected from the USB port or equivalent of the vehicle and connected to the USB port or equivalent of the external processor at step 48. Then, data exchange occurs once more at step 40, but this data exchange includes receipt of data from the vehicle as at 42. Therefore, the external processor analyzes the data received from the vehicle at step 50 to verify installation or upgrade of software or decrypt and display fault detection results. It is envisioned that a further recursion of the method may be employed if data analysis at 50 identifies need for a software upgrade based on diagnostic information corresponding to current software versions and upgrade history.

Figure 5:
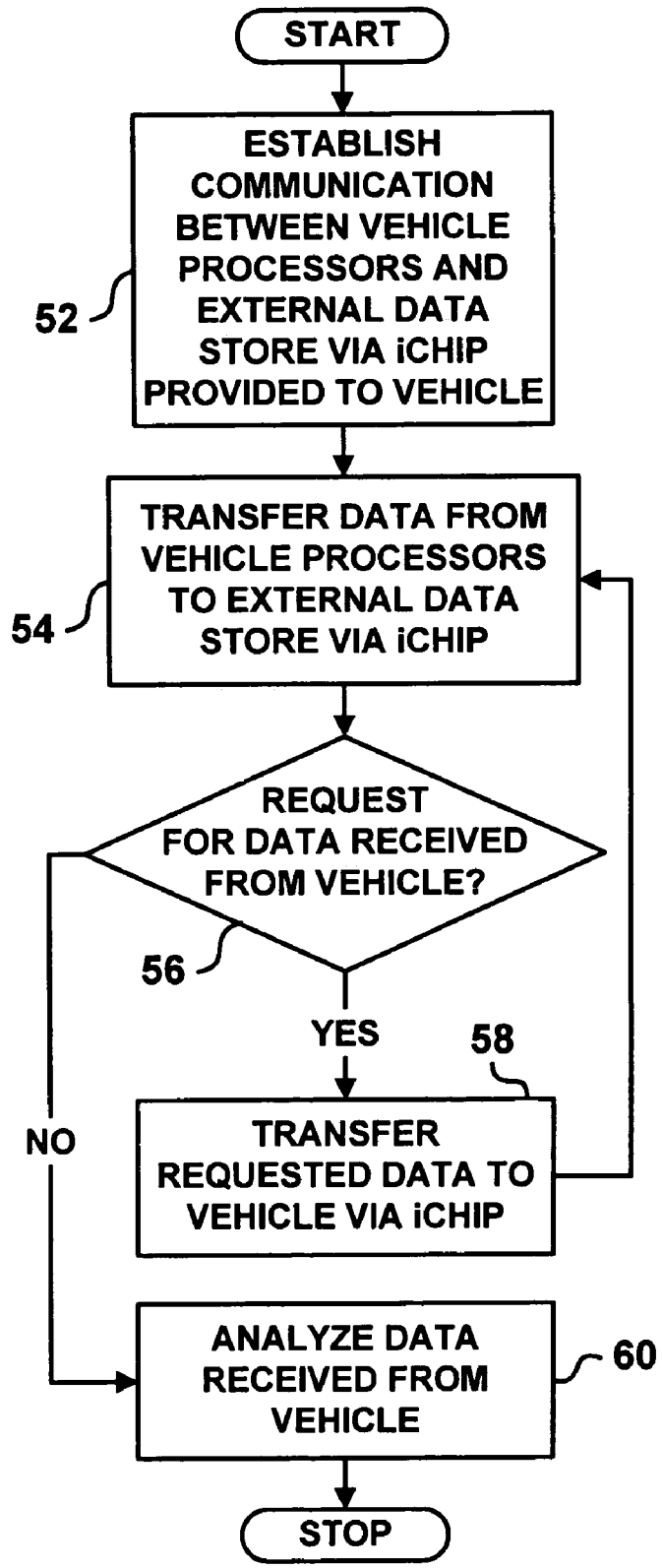
FIG. 5 is a flow diagram depicting a second embodiment of the data exchange method according to the present invention.

Referring to FIG. 5, a second embodiment of the data exchange method according to the present invention includes establishing communication between vehicle processors and an external processor via wireless data exchange mechanism provided to the vehicle at step 52. An iChip controller is preferably employed as the wireless mechanism and at least temporarily provided to the vehicle as described above with reference to FIGS. 2 and 3. Data is wirelessly transferred from the vehicle processors to an external data store of the external processor at step 54 (FIG. 5). If the data corresponds to a request from the vehicle processors for vehicle software as at 56, then the external processor wirelessly transmits the requested vehicle software files to the requesting vehicle processors at step 58. Returning to step 54, the vehicle processors, in turn, wirelessly send back diagnostic information. Since the received data is not a request for vehicle software, the external processor analyzes the diagnostic information at step 60 to verify installation or upgrade of software or decrypt and display fault detection results. It is envisioned that a further recursion of the method may be employed transmit needed software upgrades identified by analysis of the diagnostic information.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A data exchange system for use in vehicle assembly, comprising:
    a portable memory device adapted to interface with a communications port of a particular type;
    an external processor having a datastore of vehicle software and adapted to operate as a source of vehicle software via a first communications port of the particular type;
    a vehicle at least temporarily having a second communications port of the particular type and adapted to exchange data between multiple processors of the vehicle and the external processor via the portable memory device; and
    an interface processor is adapted to automatically recognize said portable memory device upon connection of said memory device to the second communications port,
    wherein the multiple processors are adapted to automatically load vehicle software from said memory device in response to the automatic recognition, and to write non-request data to said memory device following load of the vehicle software.

2. The system of claim 1, further comprising:
    a controller of a controller area network connected to a system bus of the vehicle and networked adjacent to the multiple processors wherein said interface processor is in communication with the second communications port and said controller.

3. The system of claim 2, wherein said controller is temporarily networked adjacent to the multiple processors via an alternative connection mechanism.

4. The system of claim 1, wherein said multiple processors are adapted to write data to said portable memory device following load of vehicle software from said portable memory device to said multiple processors, and said external processor is adapted to analyze data written to said portable memory device upon connection of the portable memory device to the first communications port.

5. The system of claim 1, wherein the particular type of the communications port is universal serial bus, and said portable memory device is a universal serial bus port flash memory disk.

6. A data exchange system for use in vehicle assembly, comprising:
    a wireless data exchange mechanism adapted to communicate with a communications network;
    an external processor having a datastore of vehicle software and adapted to operate as a source of vehicle software via the communications network;
    a vehicle at least temporarily adapted to exchange data between multiple processors of the vehicle and the external processor via said wireless data exchange mechanism; and
    an adapter having a control area network controller in communication with said wireless data exchange mechanism, said adapter configured to temporarily provide connectively between said wireless data exchange mechanism and the multiple processors by temporarily connecting said controller adjacent to the multiple processors via an alternative communications port.

7. The system of claim 6, wherein the wireless data exchange mechanism is an iCHIP internet controller.

8. A data exchange system for use in vehicle assembly, comprising:
    a wireless data exchange mechanism adapted to communicate with a communications network;
    an external processor having a datastore of vehicle software and adapted to operate as a source of vehicle software via the communications network;
    a vehicle at least temporarily adapted to exchange data between multiple processors of the vehicle and the external processor via said wireless data exchange mechanism; and a controller of a controller area network connected to a system bus of the vehicle and networked adjacent to the multiple processors, wherein said controller is in communication with said wireless data exchange mechanism, wherein said controller is temporarily networked adjacent to the multiple processors via an alternative connection mechanism.

9. A data exchange system for use in vehicle assembly, comprising:
   a wireless data exchange mechanism adapted to communicate with a communications network;
   an external processor having a datastore of vehicle software and adapted to operate as a source of vehicle software via the communications network; and
   a vehicle at least temporarily adapted to exchange data between multiple processors of the vehicle and the external processor via said wireless data exchange mechanism, wherein the multiple processors are adapted to request vehicle software from said external processor and to transmit non-request data to the external processor following load of vehicle software from said external processor, and said external processor is adapted to analyze non-request data received from the multiple processors.

10. A data exchange method for use in vehicle assembly, comprising:
    alternating connection of a portable memory device between an external processor and a vehicle;
    transferring vehicle software from the external processor to the portable memory device during connection of the portable memory device to the external processor via a first communication port;
    transferring data from the portable memory device to a processor of the vehicle upon connection of the portable memory device to the vehicle via a second communication port;
    automatically recognizing said portable memory device upon connection of said memory device to the second communications port;
    automatically loading vehicle software from the memory device in response to automatic recognition thereof; and
    writing non-request data to the memory device following load of the vehicle software.

11. The method of claim 10, further comprising employing an interface processor in communication with an open architecture communications port and a controller area network controller to at least temporarily provide connectivity between the portable memory device and the vehicle.

12. The method of claim 11, further comprising temporarily networking the controller adjacent to the vehicle processor via an alternative connection mechanism.

13. The method of claim 10, further comprising employing a universal serial bus flash disk as the portable memory device.

14. The method of claim 10, further comprising:
    writing data back to the portable memory device following transfer of the data from the portable memory device to the processor of the vehicle; and
    analyzing the data written back to the portable device upon connection of the portable device to the external processor.

15. A data exchange method for use in vehicle assembly, comprising;
    establishing a wireless connection between an external processor and a vehicle processor via a wireless communication mechanism at least temporarily provided to the vehicle, wherein the external processor is adapted to serve as a source of vehicle software;
    transmitting a request for vehicle software from the vehicle processor to the external processor via the wireless communication mechanism;
    transmitting the vehicle software from the external processor to the vehicle processor via the wireless communication mechanism, wherein said transmitting the vehicle software occurs in response to the request; and
    employing an adapter having a control area network controller in communication with the wireless communication mechanism, wherein the adapter is configured to temporarily provide connectively between said wireless communication mechanism and the vehicle processor by temporarily connecting the controller adjacent to the vehicle processor via an alternative communication mechanism.

16. The method of claim 15, further comprising employing an iCHIP internet controller as the wireless communication mechanism.

17. A data exchange method for use in vehicle assembly, comprising;
    establishing a wireless connection between an external processor and a vehicle processor via a wireless communication mechanism at least temporarily provided to the vehicle, wherein the external processor is adapted to serve as a source of vehicle software;
    transmitting a request for vehicle software from the vehicle processor to the external processor via the wireless communication mechanism;
    transmitting the vehicle software from the external processor to the vehicle processor via the wireless communication mechanism, wherein said transmitting the vehicle software occurs in response to the request;
    at least temporarily connecting a controller of a controller area network to a system bus of the vehicle, wherein said controller is in communication with said wireless communication mechanism; and
    temporarily networking the controller adjacent to the vehicle processor via an alternative connection mechanism.

18. A data exchange method for use in vehicle assembly, comprising;
    establishing a wireless connection between an external processor and a vehicle processor via a wireless communication mechanism at least temporarily provided to the vehicle, wherein the external processor is adapted to serve as a source of vehicle software;
    transmitting a request for vehicle software from the vehicle processor to the external processor via the wireless communication mechanism;
    transmitting the vehicle software from the external processor to the vehicle processor via the wireless communication mechanism, wherein said transmitting the vehicle software occurs in response to the request;
    transmitting non-request data to the external processor following load of vehicle software from said external processor; and
    analyzing non-request data received from the vehicle processor.

* * * * *